(12) United States Patent
Anthony

(10) Patent No.: US 10,436,340 B2
(45) Date of Patent: Oct. 8, 2019

(54) VACUUM BREAKER VALVE ASSEMBLY

(71) Applicant: GE-Hitachi Nuclear Energy Americas LLC, Wilmington, NC (US)

(72) Inventor: Gary M. Anthony, Wilmington, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 275 days.

(21) Appl. No.: 15/177,886

(22) Filed: Jun. 9, 2016

(65) Prior Publication Data

US 2017/0356557 A1    Dec. 14, 2017

(51) Int. Cl.

| | |
|---|---|
| *F16K 17/168* | (2006.01) |
| *F16K 1/12* | (2006.01) |
| *F16K 1/22* | (2006.01) |
| *F16K 17/12* | (2006.01) |
| *F16K 27/02* | (2006.01) |
| *G21C 13/02* | (2006.01) |
| *G21C 9/004* | (2006.01) |
| *F16K 15/02* | (2006.01) |

(52) U.S. Cl.
CPC ............ *F16K 17/168* (2013.01); *F16K 1/126* (2013.01); *F16K 1/22* (2013.01); *F16K 15/021* (2013.01); *F16K 17/12* (2013.01); *F16K 27/0209* (2013.01); *G21C 9/004* (2013.01); *G21C 13/022* (2013.01); *Y02E 30/40* (2013.01)

(58) Field of Classification Search
CPC ..... G21C 9/004; G21C 13/022; F16K 17/168; F16K 1/126; F16K 1/22; F16K 17/00; F16K 17/12
See application file for complete search history.

(56) References Cited

U.S. PATENT DOCUMENTS

| 5,898,748 A | 4/1999 | Thompson et al. |
| 6,990,166 B2 * | 1/2006 | Matsunaga ............. G21F 5/005 |
| | | 250/506.1 |
| 2013/0056667 A1 | 3/2013 | Shu |

FOREIGN PATENT DOCUMENTS

WO    2016/0085573 A1    6/2016

OTHER PUBLICATIONS

International Search Report and Written Opinion issued in connection with corresponding PCT Application No. PCT/US2017/36906, dated Sep. 18, 2017.

* cited by examiner

*Primary Examiner* — Lily C Garner
(74) *Attorney, Agent, or Firm* — Harness, Dickey & Pierce, P.L.C.

(57) ABSTRACT

A breaker valve assembly for a nuclear reactor containment includes a valve body, a valve body insert, and a lid. The valve body includes a first side wall defining a chamber, a first opening in a top portion of the first side wall, and a second opening in a bottom portion of the first side wall. The second opening communicates with the first opening of the valve body. The valve insert body includes a second side wall defining a second chamber, and a third opening in a bottom portion of the second side wall. The valve insert body is nested in the valve body. The lid is arranged on an upper edge of the side wall of the valve insert body. The valve insert body is configured to move substantially vertically with respect to the valve body.

17 Claims, 2 Drawing Sheets

VACUUM BREAKER VALVE ASSEMBLY

BACKGROUND

Field

The present disclosure relates to a vacuum breaker valve between a drywell and a wetwell of a nuclear reactor containment.

Description of Related Art

Reactors including a drywell and a wetwell include vacuum breaker valves therebetween. The vacuum breaker valves are designed to reduce pressure in the event of a leak.

SUMMARY

At least one example embodiment relates to a breaker valve assembly for a nuclear reactor containment.

In at least one example embodiment, a breaker valve assembly for a nuclear reactor containment includes a valve body. The valve body includes a first side wall defining a chamber, a first opening in a top portion of the first side wall, and a second opening in a bottom portion of the first side wall. The second opening communicates with the first opening of the valve body. The breaker valve assembly may also include a valve insert body nested in the valve body. The valve insert body includes a second side wall defining a second chamber, and a third opening in a bottom portion of the second side wall. The breaker valve assembly may also include a lid arranged on an upper edge of the side wall of the valve insert body. The valve insert body is configured to move substantially vertically with respect to the valve body.

In at least one example embodiment, the breaker valve assembly also includes at least one seal between the valve insert body and the valve body. The at least one seal may include an O-ring, such as a nonmetallic O-ring. The break valve assembly may include 2 to 10 seals on the insert or valve body.

In at least one example embodiment, the first side wall may include at least one outlet between adjacent seals. The breaker valve assembly may also include a sensor arranged in the at least one outlet. The sensor is configured to detect or test for fluid, gas, and/or steam.

In at least one example embodiment, the breaker valve assembly may include a regulator or test configuration configured to vent at least one of steam and gas. The regulator may include a butterfly valve.

In at least one example embodiment, the breaker valve assembly may also include a guide rod extending from the lid and a guide bushing assembly arranged about the guide rod. The guide rod may be configured to move substantially vertically within the guide bushing. The guide rod may be used for testing.

In at least one example embodiment, the breaker valve assembly may also include a valve housing and a valve housing lid. The valve body may be positioned in the valve housing.

In at least one example embodiment, the breaker valve assembly may also include a limit switch on a wall of the valve housing. The limit switch may be configured to contact a flange extending outwardly from the upper, outer edge of the valve insert body when the valve insert body is in a resting (closed) state.

In at least one example embodiment, the breaker valve assembly may also include a bumper arranged between a bottom, outer surface of the second side wall of the valve insert body and a bottom, inner surface of the first side wall of the valve body. The bumper may be on the body or insert.

In at least one example embodiment, the valve body and the valve insert body may each be generally frustoconical in shape. In some example embodiments, the valve body and the valve insert body may each be generally cylindrical in shape. The lid may be generally flat or dome-shaped.

At least one example embodiment relates to a vent pipe assembly for a nuclear reactor containment.

In at least one example embodiment, a vent pipe assembly for a nuclear reactor, the nuclear reactor including a drywell and a wetwell, the vent pipe assembly includes a standpipe having a bore therethrough. The standpipe is configured to extend through the drywell and into the wetwell to provide communication between the drywell and the wetwell. The vent pipe assembly also includes a breaker valve assembly in fluid communication with the standpipe. The breaker valve assembly may include a valve body and a valve insert body nested in the valve body. The valve body may include a first side wall defining a chamber, a first opening in a top portion of the first side wall, and a second opening in a bottom portion of the first side wall. The valve insert body may include a second side wall defining a second chain and a third opening in a bottom portion of the second side wall. The second opening communicates with the first opening of the valve body. The breaker valve assembly may also include a lid arranged on an upper edge of the side wall of valve insert body. The valve insert body is configured to move substantially vertically with respect to the valve body.

At least one example embodiment relates to a meth of relieving pressure in a nuclear reactor containment.

In at least one example embodiment, a method of relieving pressure in a nuclear reactor may include releasing one or more of steam and gas through a breaker valve assembly. The breaker valve assembly includes a valve body and a valve insert body nested in the valve body. The valve body may include a first side wall defining a chamber, a first opening in a top portion of the first side wall, and a second opening in a bottom portion of the first side wall. The valve insert body may include a second side wall defining a second chamber and a third opening in a bottom portion of the second side wall. The second opening communicates with the first opening of the valve body. The breaker valve assembly may also include a lid arranged on an upper edge of the side wall of valve insert body. The valve insert body moves substantially vertically with respect to the valve body to relieve pressure within the nuclear reactor containment compartments.

At least one example embodiment relates to a method of installing a breaker valve assembly.

In at least one example embodiment, a method of installing a breaker valve assembly may include positioning a breaker valve assembly in fluid communication with a standpipe. The breaker valve assembly may include a valve body and a valve insert body nested in the valve body. The valve body includes a first side wall defining a chamber, a first opening in a top portion of the first side wall, and a second opening in a bottom portion of the first side wall. The second opening communicates with the first opening of the valve body. The valve insert body includes a second side wall defining a second chamber, and a third opening in a bottom portion of the second side wall. The breaker valve assembly also includes a lid arranged on an upper edge of the side wall of valve insert body. The valve insert body moves substantially vertically with respect to the valve body to relieve pressure within the nuclear reactor containment compartments.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION OF EXAMPLE EMBODIMENTS

Figure 1:
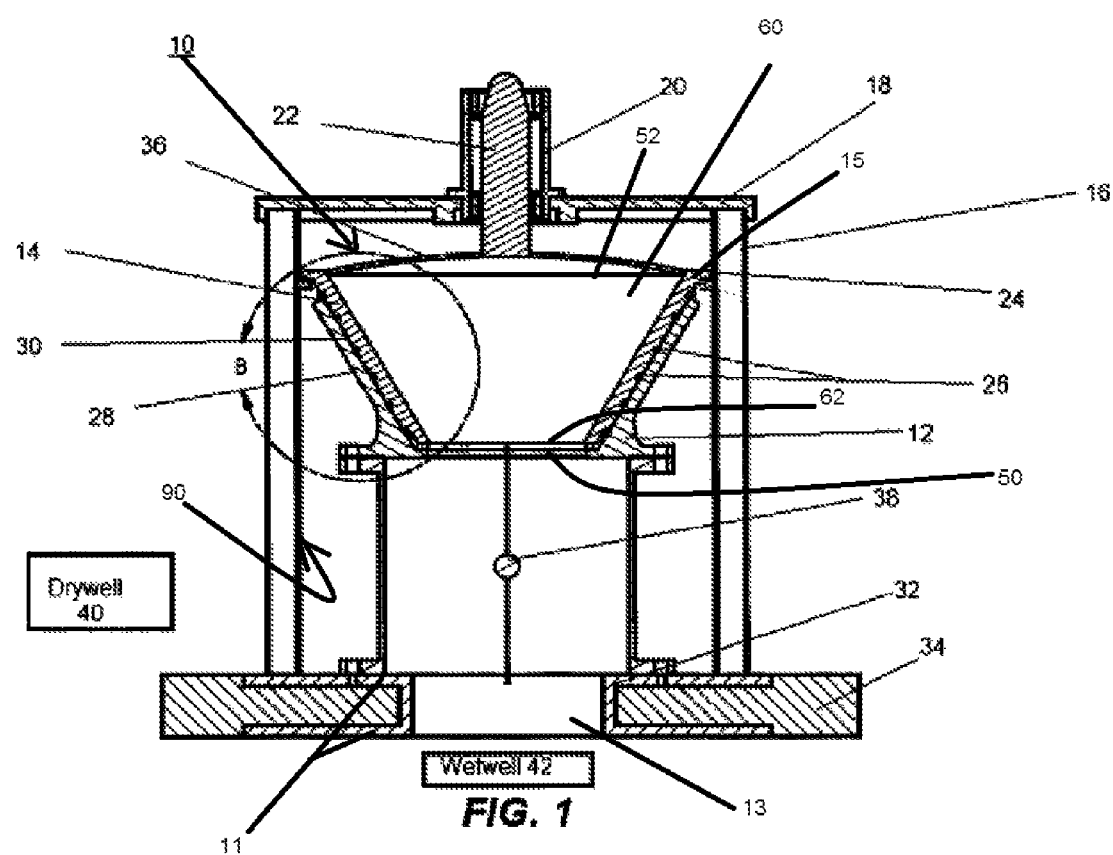
FIG. 1 is a cross-sectional illustration of a breaker valve assembly coupled to a standpipe in accordance with at least one example embodiment.

Some detailed example embodiments are disclosed herein. However, specific structural and functional details disclosed herein are merely representative for purposes of describing example embodiments. Example embodiments may, however, be embodied in many alternate forms and should not be construed as limited to only the example embodiments set forth herein.

Accordingly, while example embodiments are capable of various modifications and alternative forms, example embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various example embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

At least one example embodiment relates to a breaker valve assembly.

FIG. 1 is a cross-sectional illustration of a breaker valve assembly coupled to a standpipe in accordance with at least one example embodiment.

In at least one example embodiment, as shown in FIG. 1, a breaker valve assembly 10 is in communication with a standpipe 32. The standpipe 32 may have flanges 11 at either end. The standpipe 32 may also include a tubular bore 13 extending therethrough. The standpipe 32 extends through a drywell floor 34 that separates a drywell 40 from a wetwell 42. The standpipe 32 facilitates transporting particles, e.g., water, vapor, and non-condensables between the drywell 40 and the wetwell 42.

In at least one example embodiment, the breaker valve assembly 10 includes a valve body 12, a valve insert body 14 nested in the valve body, and a lid 36. The valve body 12 includes a first side wall 28 defining a chamber in which the valve insert body 14 is nested. The valve body 12 includes a first opening 52 in a top portion of the first side wall 28. The valve body 12 may also include a second opening 50 in a bottom portion of the first side wall 28. The second opening 50 communicates with the first opening 52 of the valve body 12.

In at least one example embodiment, the valve insert body 14 includes a second side wall 30 defining a second chamber 60. The valve insert body 14 also includes a third opening 62 in a bottom portion of the second side wall 30. The third opening 62 communicates and/or aligns with the second opening 50 in the valve body 12 when the valve insert body 14 is nested in the valve body 12.

In at least one example embodiment, the breaker valve assembly 10 may also include the lid 36 arranged on an upper edge 15 of the side wall 30 of the valve insert body 14.

In at least one example embodiment, the valve insert body 14 is configured to move substantially vertically with respect to the valve body 12 when pressure is exerted on the lid 36 of the valve insert body 14. When pressure is exerted on the lid 36 of the valve insert body 14, the valve insert body 14 may move upwards several inches with respect to the valve body 12 so as to form a passage (not shown) between the valve body 12 and the valve insert body 14. Steam, gases and/or liquids travel through the passage between the valve body 12 and the valve insert body 14 to relieve pressure in the nuclear reactor containment compartments.

In at least one example embodiment, the breaker valve assembly 10 may also include at least one seal 26 between the valve insert body 14 and the valve body 12. The at least one seal 26 may include a nonmetallic O-ring or seal. For example, the seal 26 may be a silicon O-ring. The break valve assembly 10 may include 2 to 10 (e.g., about 3 to about 8, about 4 to about 7, or about 5 to about 6) seals 26. The seal 26 may aid in sealing the opening on the standpipe 32.

In at least one example embodiment, the breaker valve assembly 10 may include a regulator 38 that is configured to vent at least one of liquid, steam, and/or gas. The regulator 38 may include a butterfly valve. If too much liquid, steam, and/or gas passes through the standpipe 32 and raises the pressure, the regulator 38 opens to equalize pressure and the liquid, steam, and/or gas enters the chamber 60 in the valve insert body 14. If the pressure becomes too high thereafter, the pressure is applied to the lid 36 and the valve insert body 14 rises vertically with respect to the valve body 12 so that the liquid, steam, and/or gas may escape between the valve body 12 and the valve insert body 14. Once pressure is relieved, the valve insert body 14 will fall back into place within the valve body 12. The regulator 38 may also be closed if leakage of insert 10 is detected.

In at least one example embodiment, the breaker valve assembly 10 may also include a guide rod 22 attached to and/or extending from the lid 36. A guide bushing assembly 20 may be arranged about the guide rod 22. The guide rod 22 may be configured to move substantially vertically within the guide bushing 20 when the valve insert body 14 rises with respect to the valve body 12. The guide rod 22 aids in maintaining positioning of the valve insert body 14 within the valve body 12 during opening and closing of the breaker valve assembly 10. The guide rod 22 may also be used for testing.

In at least one example embodiment, the breaker valve assembly 10 may also include a valve housing 16 and a valve housing lid 18. The valve body 12 may be positioned in the valve housing 16. The valve housing 16 may be formed of stainless steel and/or other metals and/or other heat resistant materials. The valve housing 16 may include holes and/or perforations therein and/or may be formed of a mesh material. Thus, the valve housing 16 protects the valve body 12, but allows release of liquids, steam and/or gas.

In at least one example embodiment, the valve housing lid 18 may be formed of stainless steel and/or other metals and/or other heat resistant materials. The valve housing lid 18 may be a solid structure. In at least one example embodiment, instrumentation for the reactor containment and/or breaker valve assembly may be mounted thereon if desired. In at least one example embodiment, the guide rod bushing 20 may be mounted on and/or extend through the valve housing lid 18.

In at least one example embodiment, the valve body 12 and the valve insert body 14 may each be generally frusto-conical in shape. The valve body and the valve insert body may each be generally cylindrical in shape. The lid 36 may be generally flat or generally dome-shaped. A frustoconically-shaped, valve insert body 14 and a dome-shaped lid 36 increase the surface area against which pressure may be exerted.

In at least one example embodiment, the valve body 12 and the valve insert body 14 are formed of titanium and/or stainless steel, however other materials may be used.

Figure 2:
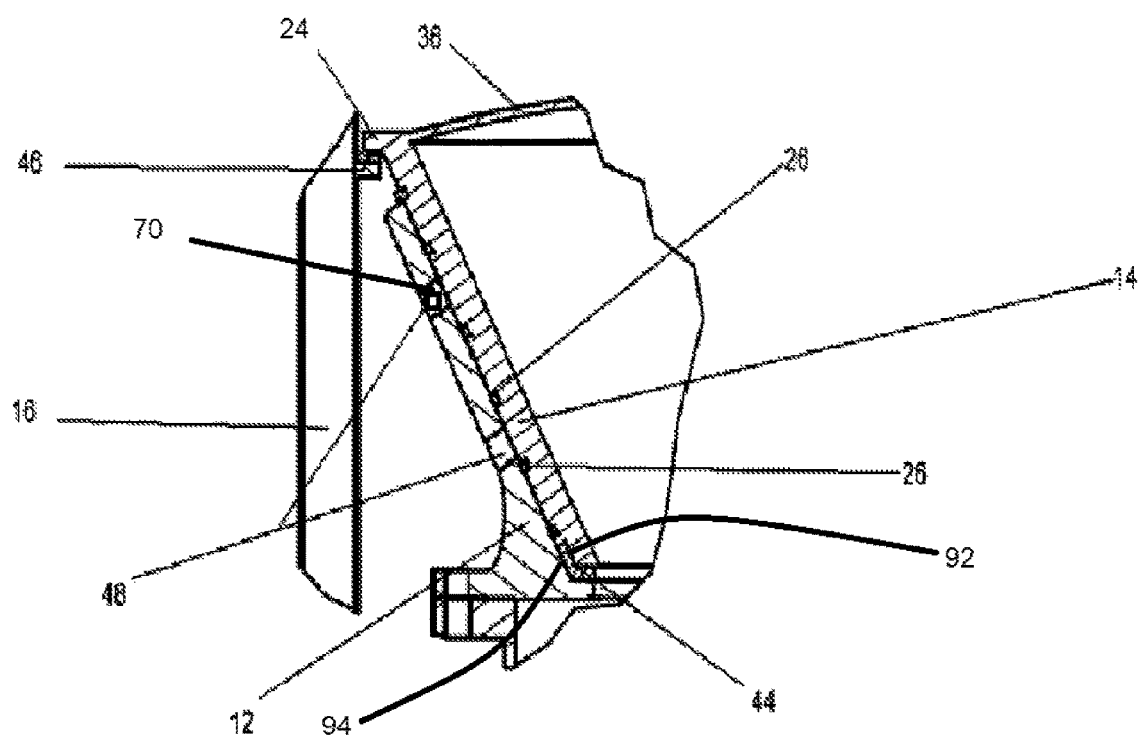
FIG. 2 is an enlarged view of a portion of a breaker valve in accordance with at least one example embodiment.

FIG. 2 is an enlarged view of a portion of the valve body 12 and the valve insert body 14.

In at least one example embodiment, as shown in FIG. 2, the first side wall 28 of the valve body 12 may include at least one outlet 48 between adjacent seals 26. In at least one example embodiment, the breaker valve assembly 10 may also include at least one sensor port 70 arranged in the at least one outlet 48. The sensor port 70 is configured to detect fluid, gas, and/or steam, which may be indicative of a leak.

In at least one example embodiment, the breaker valve assembly 10 may also include a limit or position switch 46 on an inner wall 90 of the valve housing 16. The limit or position switch 46 may be configured to contact a flange or insert 24 that extends outwardly from an upper edge of the valve insert body 14 when the valve insert body 14 is in a resting state and no pressure is being relieved from the standpipe 32.

In at least one example embodiment, the limit or position switch 46 allows a nuclear reactor operator to determine whether or not the breaker valve assembly 10 is in a resting state and/or is open to relieve pressure.

In at least one example embodiment, the breaker valve assembly 10 may also include a bumper 44 arranged between a bottom, outer surface 92 of the second side wall 30 of the valve insert body 14 and a bottom, inner surface 94 of the first side wall 28 of the valve body 12. The bumper 44 may be formed of a nonmetallic material, such as silicon and/or rubber. The bumper 24 may provide a cushion or gall protection between the valve insert body 14 and the valve body 12.

In at least one example embodiment, a nuclear reactor containment includes at least one breaker valve assembly 10, and may include two, three, or more breaker valve assemblies 10.

At least one example embodiment relates to a method of relieving pressure in nuclear reactor containment compartments.

In at least one example embodiment, a method of relieving pressure in a nuclear reactor containment compartment may include releasing one or more of steam and gas through the breaker valve assembly 10.

At least one example embodiment relates to a method of installing a breaker valve assembly.

In at least one example embodiment, a method of installing a breaker valve assembly may include positioning a breaker valve assembly in fluid communication with a standpipe. The breaker valve assembly may include the components discussed above with respect to FIGS. 1 and 2.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

I claim:

1. A breaker valve assembly for a nuclear reactor containment, the breaker valve assembly comprising:
   a valve body having a generally frustoconical shape, the valve body including,
      a first side wall defining a chamber,
      a first opening in a top portion of the first side wall, and
      a second opening in a bottom portion of the first side wall;
   a valve insert body nested in the valve body, the valve insert body having a generally frustoconical shape, the valve insert body including,
      a second side wall defining a second chamber, and
      a third opening in a bottom portion of the second side wall, the second opening aligning with the third opening of the valve body; and
   a lid arranged on an upper edge of the second side wall of the valve insert body at a widest portion of the valve insert body, the valve insert body configured to move substantially vertically with respect to the valve body when pressure is applied to the lid.

2. The breaker valve assembly of claim 1, further comprising:
   at least one seal between the valve insert body and the valve body.

3. The breaker valve assembly of claim 2, wherein the at least one seal comprises a nonmetallic seal.

4. The breaker valve assembly of claim 2, wherein the breaker valve assembly includes 2 to 10 seals.

5. The breaker valve assembly of claim 4, wherein the first side wall includes at least one outlet between adjacent seals.

6. The breaker valve assembly of claim 5, further comprising:
   a sensor port arranged in the at least one outlet, and
   a sensor configured to detect fluid.

7. The breaker valve assembly of claim 1, further comprising:
   a regulator configured to vent or seal at least one of steam and gas.

8. The breaker valve assembly of claim 7, wherein the regulator comprises a butterfly valve.

9. The breaker valve assembly of claim 1, further comprising:
   a guide rod extending from the lid; and
   a guide bushing assembly arranged about the guide rod, the guide rod configured to move substantially vertically within the guide bushing.

10. The breaker valve assembly of claim 1, further comprising:
    a valve housing; and
    a valve housing lid, the valve body positioned in the valve housing.

11. The breaker valve assembly of claim 10, further comprising:
    a limit or position switch on a wall of the valve housing, the limit or position switch configured to contact a flange or the valve insert body extending outwardly from the upper edge of the valve insert body when the valve insert body is in a resting state.

12. The breaker valve assembly of claim 1, further comprising:
    a bumper arranged between a bottom, outer surface of the second side wall of the valve insert body and a bottom, inner surface of the first side wall of the valve body.

13. The breaker valve assembly of claim 12, wherein the bumper is installed on at least one of the bottom, outer surface of the second side wall of the valve insert body and the bottom, inner surface of the first side wall of the valve body.

14. The breaker valve assembly of claim 1, wherein the lid is generally dome-shaped.

15. The breaker valve assembly of claim 1, wherein the lid is generally flat.

16. A vent pipe assembly for a nuclear reactor containment, the nuclear reactor including a drywell and a wetwell, the vent pipe assembly comprising:
    a standpipe having a bore therethrough, the standpipe configured to extend through the drywell and into the wetwell to provide communication between the drywell and the wetwell; and
    a breaker valve assembly in fluid communication with the standpipe, the breaker valve assembly including,
       a valve body having a generally frustoconical shape, the valve body including,
          a first side wall defining a chamber,
          a first opening in a top portion of the first side wall, and
          a second opening in a bottom portion of the first side wall,
       a valve insert body nested in the valve body, the valve insert body having a generally frustoconical shape, the valve insert body including,
          a second side wall defining a second chamber, and
          a third opening in a bottom portion of the second side wall, the second opening aligning with the third opening of the valve body, and
       a lid arranged on an upper edge of the second side wall of the valve insert body at a widest portion of the valve insert body, the valve insert body configured to move substantially vertically with respect to the valve body when pressure is applied to the lid.

17. A method of installing a breaker valve assembly comprising:
    positioning a breaker valve assembly in fluid communication with a standpipe, the breaker valve assembly including,
    a valve body having a generally frustoconical shape, the valve body including,
       a first side wall defining a chamber,
       a first opening in a top portion of the first side wall, and
       a second opening in a bottom portion of the first side wall,
    a valve insert body nested in the valve body, the valve insert body having a generally frustoconical shape, the valve insert body including,
       a second side wall defining a second chamber, and
       a third opening in a bottom portion of the second side wall, the second opening aligning with the third opening of the valve body; and
    a lid arranged on an upper edge of the second side wall of valve insert body at a widest portion of the valve insert body, the valve insert body moving substantially vertically with respect to the valve body to relieve pressure within nuclear reactor containment compartments when pressure is applied to the lid.

* * * * *